United States Patent [19]

Cheron

[11] 4,113,923
[45] Sep. 12, 1978

[54] FUEL CELL INCLUDING AT LEAST ONE IMPROVED ELEMENT

[75] Inventor: Jacques Cheron, Maisons-Lafitte, France

[73] Assignee: Institut Francais du Petrole, France

[21] Appl. No.: 727,804

[22] Filed: Sep. 29, 1976

[30] Foreign Application Priority Data

Oct. 9, 1975 [FR] France .............................. 75 31215

[51] Int. Cl.² ........................................... H01M 4/70
[52] U.S. Cl. ......................................... 429/36; 429/44
[58] Field of Search ..................... 429/15, 34, 36, 44

[56] References Cited

U.S. PATENT DOCUMENTS

| 963,852 | 7/1910 | Benko | 429/15 |
| 3,012,086 | 12/1961 | Vahldieck | 429/34 |

Primary Examiner—John H. Mack
Assistant Examiner—H. A. Feeley
Attorney, Agent, or Firm—Craig & Antonelli

[57] ABSTRACT

The fuel cell improved element comprises two terminal electrodes with intermediate electrodes formed by the arms of at least one pair of U- or V-shaped members engaging each other. These electrodes delimit chambers such that a chamber fed with electrolyte is located between a chamber fed with fuel and a chamber fed with a combustion sustaining fluid.

16 Claims, 4 Drawing Figures

FUEL CELL INCLUDING AT LEAST ONE IMPROVED ELEMENT

The present invention relates to a fuel cell including at least one improved element.

Fuel cells comprise electrodes assembled in fuel cell elements which are interconnected according to the specifications of the fuel cell.

In the prior art fuel cells the electrodes are provided with lugs constituting connecting elements whereby, during the fuel cell construction, any desired electrical connection can be achieved through any known method, such as, for example, by welding.

At the present time such electrical connections raise problems by making more difficult the manufacture of fuel cells, since the number of these connections increase with the nominal electrical power of the fuel cell and much care is required for making such connections.

An object of the invention is to provide a fuel cell which does not suffer from the above-mentioned drawbacks.

More particularly, the present invention relates to a fuel cell including at least one element which does not need to be electrically connected in the course of operation of assembling the elements of the fuel cell.

When the fuel cell is made of a plurality of elements the present invention makes it possible to electrically connect these elements to one another outside the fuel cell, these connections being thus more easily performed.

Figure 1A:
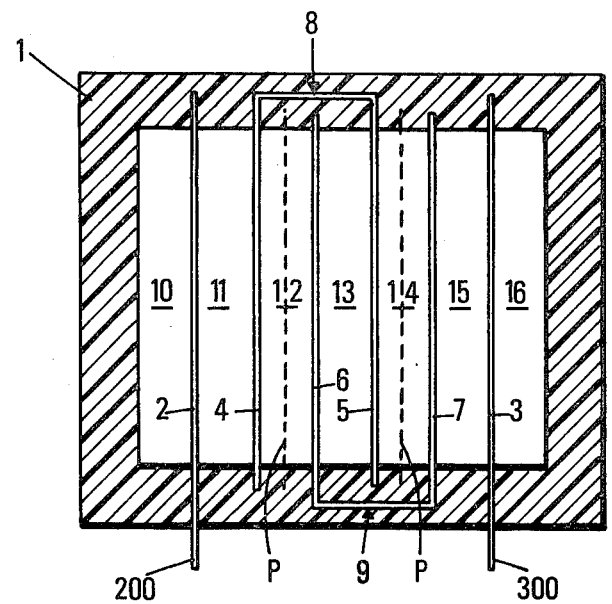
Figure 1B:
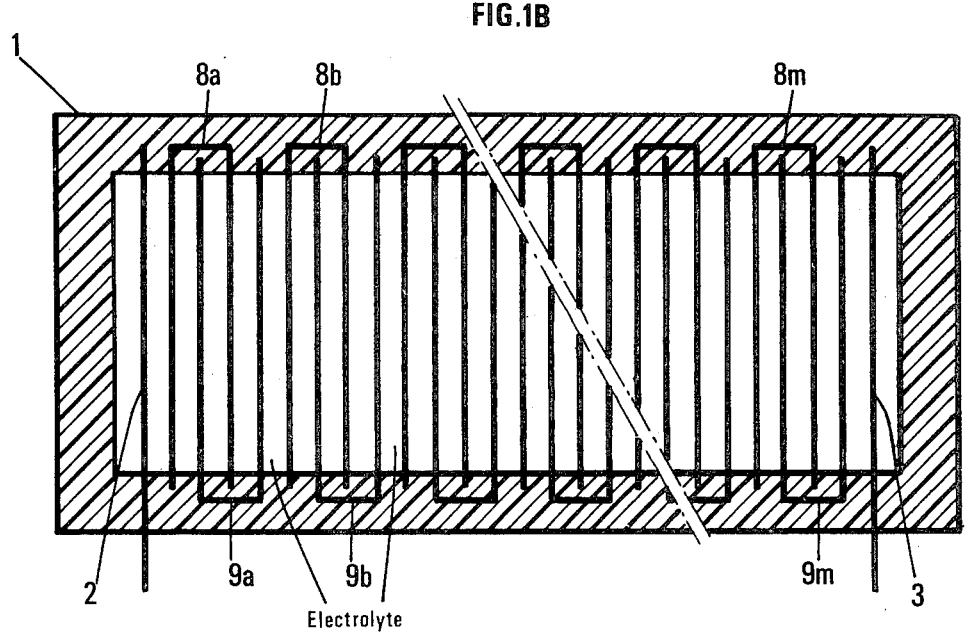
Figure 2:
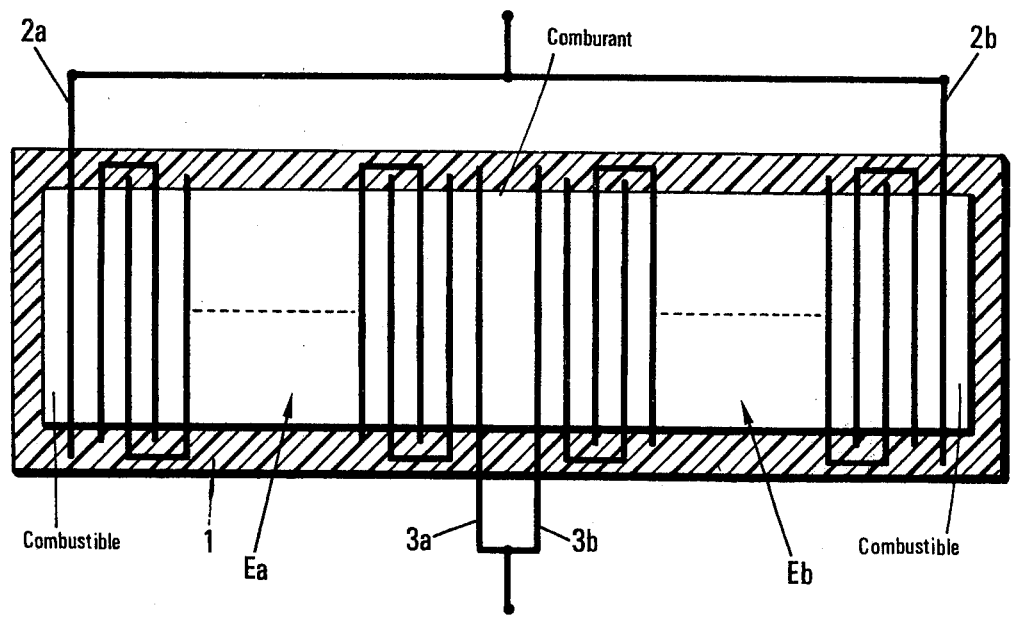

All the advantages of the present invention will be made apparent from the following description of some particular, non limitative, embodiments of this invention, illustrated by the accompanying drawings wherein:

FIG. 1A and 1B diagrammatically show a cross section of a fuel cell block according to the invention comprising a single element, FIG. 2 shows a fuel cell block comprising two elements connected in parallel.

Figure 3:
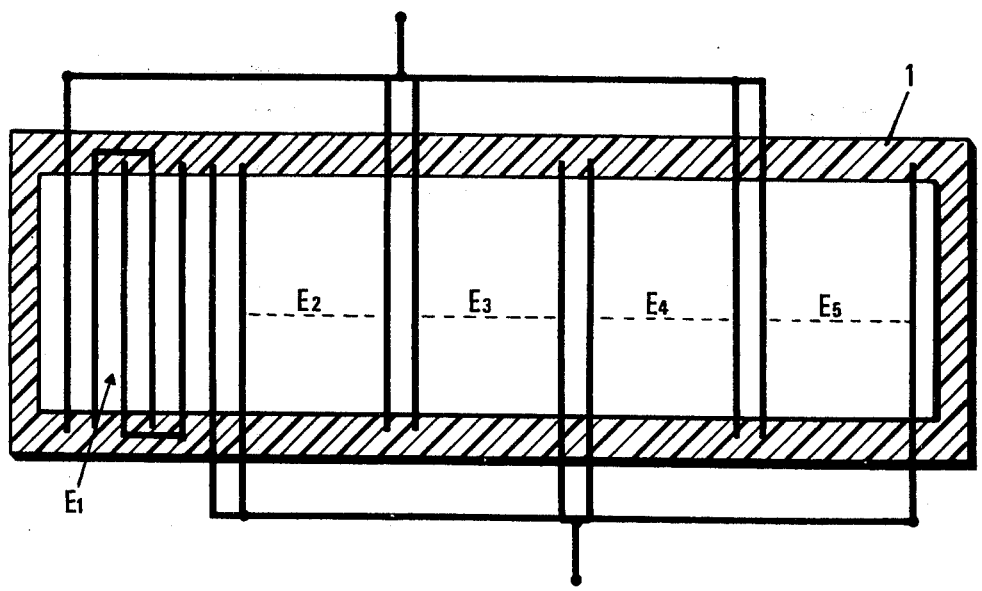

FIG. 3 illustrates more generally a fuel cell acccording to the invention comprising a plurality of elements.

FIG. 1A diagrammatically shows in cross section a fuel cell block comprising a single element. Reference numeral 1 designates the fuel cell block wherein two terminal electrodes 2 and 3, and intermediate electrodes 4 to 7, between the end electrodes, delimit chambers 10 to 16.

Some of these chambers are devised to contain an electrolyte, such as, for example, potassium hydroxide; other chambers are devised to contain a combustion sustaining fluid, such as pure oxygen $O_2$ or air, and the remainder of the chambers will contain a fuel, such as, for example, hydrogen $H_2$. The fuel cell is provided with means, not illustrated, for feeding the block with an electrolyte, a combustion-sustaining fluid and a fuel. Such means, constituted by circuits provided with suitable devices for feeding the fuel cell block 1 under well determined conditions, are known in the art and therefore need no further description.

The terminal electrodes 2 and 3 are provided with lugs forming connecting members 200 and 300, whereby the fuel cell can be connected to a load circuit.

As shown in FIG. 1A, the intermediate electrodes 4 to 7 are constituted by the arms of two U- or V-shaped members designated by reference numerals 8 and 9 respectively.

As will be apparent from FIG. 1A, these electrically conducting two U- or V-shaped members are insulated from each other by being mounted in the walls of the cell housing which, as indicated below, are made of an insulating material, and so positioned that one arm of each of said members is inserted between the two arms of the other member. As will further be apparent from FIG. 1A, the arms of these two U- or V-shaped members, together with the walls of the cell housing therebetween a central chamber 13 and two adjacent chambers on both sides of said central chamber.

Moreover the U- or V-shaped members delimit with the terminal electrodes 2 and 3 the chambers 11 and 15, while chambers 10 and 16 are delimited between the terminal electrodes and the fuel cell block 1.

During operation of the fuel cell, chambers 11, 13 and 15 are filled with electrolyte, while chambers 10 and 14 are fed with combustion sustaining fluid through supply means not shown, and chambers 12 and 16 are fed with fuel.

It is thus apparent from FIG. 1A that each electrolyte chamber is located between a fuel chamber and a chamber containing the combustion sustaining fluid.

The U- or V-shaped members are preferably formed of a sheet of an electrically conducting material, for example a sheet of expanded metal, each face of the arms of these U- or V-shaped members being coated with a suitable catalyst, as is well known in the art.

It is, therefore, further apparent from FIG. 1A that, in the cell element shown there, the electrodes are placed electrically in series since the contents of the various compartments, except in the end compartments, operate on both active surfaces of the electrodes. Members 8 and 9 can thus be obtained through a simple folding operation.

During the manufacture of the fuel cell the members 8 and 9 are positioned as hereinabove indicated and the different chambers are sealed with respect to one another by means of an insulating material, such as a resin constituting the fuel cell block.

Owing to these U- or V-shaped members, the operations of electrically connecting the electrodes to one another can be omitted, which results in a simplified manufacture of the fuel cell block, and also makes it possible to make the electrodes of such materials as, for example, aluminum, which could not be used in the manufacture of the prior art fuel cells, when the electric connections had to be performed by welding.

In order to reduce to a minimum the electric losses by short-circuit, it is preferable to insert between two consecutive electrodes which delimit a chamber fed with fuel or with a combustion-sustaining fluid, an insulating plate P, shown in dotted line FIG. 1A.

FIG. 1A illustrates the smallest fuel cell element which can be made, this element delivering electric current under a voltage $u$.

When an electric voltage $U$ greater than $u$ has to be supplied, the number of intermediate electrodes must be increased by inserting between the terminal electrodes 2 and 3 a plurality of pairs of V-shaped members $8a$–$9a$, $8b$–$9b$, ... $8m$–$9m$, similar to the pair 8–9 shown by FIG. 1A, the chambers delimited between two electrodes belonging to two pairs of adjacent U- or V-shaped members being fed with electrolyte as shown by FIG. 1B.

FIG. 2 illustrates an embodiment comprising two similar elements $E_a$ and $E_b$, electrically connected in parallel so that the fuel cell can supply the load circuit with a higher electric current.

The terminal electrodes of the same polarity 2a-2b and 3a-3b are electrically connected to one another outside the fuel cell block, whereby a good electrical connection can be achieved.

The number of fuel cell elements connected in parallel may be selected at will. In FIG. 3, five fuel elements $E_1$ to $E_5$ has been shown by way of example, the number of these elements depending exclusively on the overall electric current which is it desired to obtain in the load circuit.

I claim:

1. A fuel cell including at least one fuel cell element comprising a fuel cell housing, two terminal electrodes within said housing provided with external electrical connection means and intermediate electrodes between said terminal electrodes, said electrodes being mounted in the walls of said housing and separated from one another, said electrodes, together with the walls of said housing delimiting electrolyte chambers, fuel chambers and chambers containing a combustion sustaining fluid, wherein said intermediate electrodes are formed by at least one pair of U- or V-shaped members electrically insulated from each other, each exposed face of said U- or V-shaped members being coated with a catalyst each member being so positioned that one of the members of said pair has one arm inserted between the opposite arms of the other member thereof, said arms constituting the intermediate electrodes and delimiting between each other a central chamber and two adjacent chambers on both sides of said central chamber, and wherein said central chamber and said adjacent chambers delimited by the terminal electrodes and the intermediate electrodes adjacent to said terminal electrodes from electrolyte chambers, each of which is located between a fuel chamber and a chamber containing the combustionsustaining fluid, whereby each catalyst-coated face of said U- or V-shaped members is in contact with fuel or combustion sustaining fluid, respectively.

2. A fuel cell according to claim 1, wherein said intermediate electrodes are formed by the arms of a plurality of U- or V-shaped members, the compartments delimited by two adjacent intermediate electrodes belonging to two distinct U- or V-shaped members constituting electrolyte chambers.

3. A fuel cell according to claim 1 comprising at least two fuel cell elements and means electrically connecting the terminal electrodes of the same polarity of said elements, so that said elements are connected in parallel.

4. A fuel cell according to claim 1 wherein said U- or V-shaped members are made of a preformed sheet of expanded metal.

5. A fuel cell according to claim 4, wherein said U- or V-shaped members are made of aluminium.

6. A fuel cell according to claim 1, wherein said fuel chambers contain hydrogen.

7. A fuel cell according to claim 1, wherein said chambers containing a combustion sustaining fluid contain oxygen or air.

8. A fuel cell according to claim 1, wherein said electrolyte chambers contain potassium hydroxide.

9. A fuel cell according to claim 2, comprising at least two fuel cell elements and means electrically connecting the terminal electrodes of the same polarity of said elements, so that said elements are connected in parallel.

10. A fuel cell according to claim 2, wherein said U- or V-shaped members are made of a preformed sheet of expanded metal.

11. A fuel cell according to claim 10, wherein said U- or V-shaped members are made ofaluminum.

12. A fuel cell according to claim 3, wherein said U- or V-shaped members are made of a preformed sheet of expanded metal.

13. A fuel cell according to claim 12, wherein said U- or V-shaped members are made of aluminum.

14. A fuel cell according to claim 9, wherein said U- or V-shaped members are made of a preformed sheet of expanded metal.

15. A fuel cell according to claim 14, wherein said U- or V-shaped members are made of aluminum.

16. A fuel cell according to claim 1, further comprising an insulating plate between the intermediate electrodes delimiting between each other said adjacent chambers.